(12) United States Patent
Stewart et al.

(10) Patent No.: US 9,364,987 B2
(45) Date of Patent: Jun. 14, 2016

(54) SYSTEMS AND METHODS FOR COOLING EXTRUDED MATERIALS

(71) Applicant: Manchester Copper Products, LLC, Rockledge, FL (US)

(72) Inventors: Charles L. Stewart, Indialantic, FL (US); Mark R. Denison, Melbourne, FL (US); Robert Wessner, Merritt Island, FL (US)

(73) Assignee: Manchester Copper Products, LLC, Rockledge, FL (US)

( * ) Notice: Subject to any disclaimer, the term of this patent is extended or adjusted under 35 U.S.C. 154(b) by 701 days.

(21) Appl. No.: 13/650,972

(22) Filed: Oct. 12, 2012

(65) Prior Publication Data
US 2014/0103570 A1 Apr. 17, 2014

(51) Int. Cl.
B29C 47/00 (2006.01)
B29C 47/88 (2006.01)
B29C 47/86 (2006.01)

(52) U.S. Cl.
CPC ........... B29C 47/0085 (2013.01); B29C 47/882 (2013.01); B29C 47/0004 (2013.01); B29C 47/864 (2013.01)

(58) Field of Classification Search
CPC .......................... B29C 47/0085; B21C 29/00
See application file for complete search history.

(56) References Cited

U.S. PATENT DOCUMENTS

| 411,060 A | 9/1889 | Robertson |
| 2,002,966 A | 5/1935 | Sparks |
| 2,596,552 A | 5/1952 | Heimann |
| 2,698,683 A | 1/1955 | Martin et al. |
| 2,929,499 A | 3/1960 | Turner |
| 2,988,211 A | 6/1961 | Kent et al. |
| 3,260,095 A | 7/1966 | Flanagan |
| 3,422,493 A | 1/1969 | Heston |
| 3,455,137 A | 7/1969 | Edgecombe |
| 3,585,832 A | 6/1971 | Hinshaw et al. |
| 3,640,656 A | 2/1972 | Boguslawski |
| 3,798,954 A | 3/1974 | Asari |
| 4,053,274 A | 10/1977 | Lemelson |
| 4,154,081 A | 5/1979 | Boshold |
| 4,178,982 A | 12/1979 | Sevastakis |
| 4,192,162 A | 3/1980 | Zilges et al. |

(Continued)

FOREIGN PATENT DOCUMENTS

| EP | 1785204 | 5/2007 |
| JP | 57130718 | 8/1982 |

(Continued)

OTHER PUBLICATIONS

International Search Report and Written Opinion dated Jan. 24, 214 for PCT/US2013/064585.

*Primary Examiner* — Galen Hauth
(74) *Attorney, Agent, or Firm* — Ropes & Gray LLP

(57) ABSTRACT

Systems, devices, and methods are described for cooling extruded materials. In certain embodiments, a quench tube is provided that includes an inner wall and an outer wall having a channel therebetween for transporting cooling fluid along the quench tube. A passage within the inner surface of the inner wall receives an extruded material through a nozzle formed at an end of the quench tube that delivers the cooling fluid to the extruded material. The channel may be angled at the nozzle to deliver the cooling fluid at an angle with respect to the quench tube, and the quench tube is configured to extend at least in part within an extrusion die.

21 Claims, 3 Drawing Sheets

(56) References Cited

U.S. PATENT DOCUMENTS

| | | |
|---|---|---|
| 4,208,897 A | 6/1980 | Akeret |
| 4,223,548 A | 9/1980 | Wagner et al. |
| 4,242,897 A | 1/1981 | Ahmed et al. |
| 4,300,378 A | 11/1981 | Thiruvarudchelvan |
| 4,316,373 A * | 2/1982 | Zilges et al. ............. 72/45 |
| 4,399,676 A | 8/1983 | Noyori et al. |
| 4,528,832 A | 7/1985 | Fuchs |
| 4,606,211 A | 8/1986 | Noyori et al. |
| 4,817,411 A | 4/1989 | Bennett et al. |
| 4,825,677 A | 5/1989 | Bessey et al. |
| 5,178,814 A | 1/1993 | Lemond |
| 5,188,676 A | 2/1993 | Taylor |
| 5,505,887 A | 4/1996 | Zdrahala et al. |
| 5,572,894 A | 11/1996 | Yano |
| 5,600,900 A | 2/1997 | Marschke |
| 5,666,846 A | 9/1997 | Chen et al. |
| 5,678,442 A | 10/1997 | Ohba et al. |
| 5,687,604 A | 11/1997 | Robbins |
| 5,823,038 A | 10/1998 | Jakoby |
| 5,874,032 A | 2/1999 | Zdrahala et al. |
| 5,964,120 A | 10/1999 | Iwase et al. |
| 6,158,999 A | 12/2000 | Hartman et al. |
| 6,418,732 B1 | 7/2002 | Klane et al. |
| 6,814,561 B2 | 11/2004 | Venditti et al. |
| 7,017,352 B2 | 3/2006 | Hutchison et al. |
| 7,448,245 B2 | 11/2008 | Muschalik et al. |
| 7,591,163 B2 | 9/2009 | Yamamoto |
| 2002/0029601 A1 | 3/2002 | Kwok |
| 2004/0055352 A1 | 3/2004 | Lottner |
| 2010/0064756 A1 | 3/2010 | Kraft |
| 2010/0196643 A1 | 8/2010 | Dugard et al. |

FOREIGN PATENT DOCUMENTS

| | | |
|---|---|---|
| JP | 2004-009112 | 1/2004 |
| JP | 2004-034064 | 2/2004 |
| JP | 2007-130661 | 5/2007 |
| KR | 10-1999-0084470 | 12/1999 |
| KR | 10-2005-0047542 | 5/2005 |
| WO | WO2009/008819 | 1/2009 |

* cited by examiner

SYSTEMS AND METHODS FOR COOLING EXTRUDED MATERIALS

BACKGROUND

Quenching is the process of rapidly cooling a material to obtain certain material properties. For example, rapidly cooling an extruded material can prevent material transformations from occurring due to the narrow window of time in which the reaction is thermodynamically favorable. In the context of extruding metal tubing using an extrusion die, the distance at which the extruded metal tubing extends from the die before quenching occurs affects the material properties of the metal tubing. Even at quenching distances as small as an eighth of an inch there can be measurable changes in the quality of the metal tubing. For extruded metal tubing, it is desirable to quench the extruded product as close to the exit of the extrusion die as possible. Present techniques do not allow for such rapid quenching of extruded metal tubing as the tubing exits the extrusion die.

SUMMARY

Disclosed herein are systems, devices, and methods for quenching or cooling extruded materials. In certain embodiments, the systems, devices, and methods include a quench tube for spray quenching an extruded material such as metal tubing as the extruded material exits an extrusion die. In certain embodiments, the extrusion die may be a rotating extrusion die.

In one aspect, the systems, devices, and methods include a quench tube comprising an inner wall and an outer wall having a channel therebetween for transporting cooling fluid along the quench tube, a passage within an inner surface of the inner wall that receives an extruded material, and a nozzle formed at an end of the quench tube that delivers the cooling fluid to the extruded material and through which the extruded material passes to enter the passage, wherein the channel is angled at the nozzle to deliver the cooling fluid at an angle with respect to the quench tube, and wherein the quench tube is configured to extend at least in part within an extrusion die. The inner wall and the outer wall may be concentric. In certain implementations, the inner wall comprises an inner tube and the outer wall comprises an outer tube. In some implementations, the extrusion die rotates and the quench tube does not rotate. The cooling fluid may be water.

In certain implementations, the quench tube includes a plurality of holes in the inner wall along at least a portion of the quench tube, and the holes may be equidistant from one another. In certain implementations, the quench tube includes an end cap positioned at the nozzle, wherein the angled channel is positioned within the end cap. The end cap may be structured to fit within a portion of the extrusion die and the cooling fluid may be delivered through the end cap.

In certain implementations, the cooling fluid is delivered at an angle that substantially aligns with a recess of the extrusion die. The nozzle delivers the cooling fluid as a convergent fluid stream, wherein the fluid stream narrows from a first diameter to a second diameter in the direction of flow, and wherein the second diameter is smaller than the first diameter. In certain implementations, the convergent fluid stream is shaped to substantially conform to the shape of a cutout in the extrusion die. In certain implementations, the cooling fluid contacts the extruded material as the extruded material exits the extrusion die. In some implementations, the cooling fluid contacts the extruded material within approximately $1/16$ of an inch to 1 inch of the extruded material exiting the extrusion die or within approximately $1/8$ of an inch to $1/2$ of an inch of the extruded material exiting the extrusion die.

In one aspect, a method for quenching an extruded material is provided that includes positioning an elongate quench tube at an exit side of an extrusion die, wherein the quench tube includes a nozzle that is positioned within at least a portion of the extrusion die, pressing the extruded material through the extrusion die, wherein the extruded material passes through the nozzle into the quench tube, and delivering the cooling fluid to the extruded material via the nozzle as the extruded material exits the extrusion die, wherein the cooling fluid is delivered at an angle with respect to the quench tube. In certain implementations, the cooling fluid may be delivered at an angle that substantially aligns with a recess of the extrusion die. The nozzle delivers the cooling fluid as a convergent fluid stream, wherein the fluid stream narrows from a first diameter to a second diameter in the direction of flow, wherein the second diameter is smaller than the first diameter. In certain implementations, the convergent fluid stream is shaped to substantially conform to the shape of a cutout in the extrusion die. The cooling fluid may be water.

In one aspect, a quenching system is provided that comprises means for transporting cooling fluid along a quench tube having an inner wall and an outer wall, a passage within an inner surface of the inner wall that receives an extruded material, and means for delivering the cooling fluid to the extruded material at an angle with respect to the quench tube, wherein the extruded material passes through the delivering means to enter the passage, and wherein the quench tube is configured to extend at least in part within an extrusion die. The inner wall and the outer wall may be concentric. In certain implementations, the inner wall comprises an inner tube and the outer wall comprises an outer tube. In some implementations, the extrusion die rotates and the quench tube does not rotate. The cooling fluid may be water.

In certain implementations, the quenching system includes a plurality of holes in the inner wall along at least a portion of the quench tube, and the holes may be equidistant from one another. In certain implementations, the quenching system includes an end cap positioned at the delivering means. The end cap may be structured to fit within a portion of the extrusion die and the cooling fluid may be delivered through the end cap.

In certain implementations, the cooling fluid is delivered at an angle that substantially aligns with a recess of the extrusion die. The delivering means delivers the cooling fluid as a convergent fluid stream, wherein the fluid stream narrows from a first diameter to a second diameter in the direction of flow, and wherein the second diameter is smaller than the first diameter. In certain implementations, the convergent fluid stream is shaped to substantially conform to the shape of a cutout in the extrusion die. In certain implementations, the cooling fluid contacts the extruded material as the extruded material exits the extrusion die. In some implementations, the cooling fluid contacts the extruded material within approximately $1/16$ of an inch to 1 inch of the extruded material exiting the extrusion die or within approximately $1/8$ of an inch to $1/2$ of an inch of the extruded material exiting the extrusion die.

Variations and modifications of these embodiments will occur to those of skill in the art after reviewing this disclosure. The foregoing features and aspects may be implemented, in any combination and subcombination (including multiple dependent combinations and subcombinations), with one or more other features described herein. The various features described or illustrated herein, including any components thereof, may be combined or integrated in other systems. Moreover, certain features may be omitted or not implemented.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the systems, devices, and methods described herein, certain illustrative embodiments will be described. Although the embodiments and features described herein are specifically described for use in connection with extrusion press systems, it will be understood that all the components, connection mechanisms, manufacturing methods, and other features outlined below may be combined with one another in any suitable manner and may be adapted and applied to systems to be used in other manufacturing processes, including, but not limited to cast-and-roll, up-casting, other extrusion, and other manufacturing procedures. Furthermore, although the embodiments described herein relate to quenching extruded metal tubing formed from billets, it will be understood that the systems, devices, and methods herein may be adapted and applied to systems for quenching or otherwise cooling any suitable type of material.

The systems, devices, and method described herein for cooling an extruded material may be used in any suitable extrusion system, including, for example, the extrusion press system described in copending, commonly-assigned U.S. patent application Ser. No. 13/650,977, filed concurrently herewith, and entitled "EXTRUSION PRESS SYSTEMS AND METHODS," the disclosure of which is hereby incorporated by reference herein in its entirety.

Figure 1:
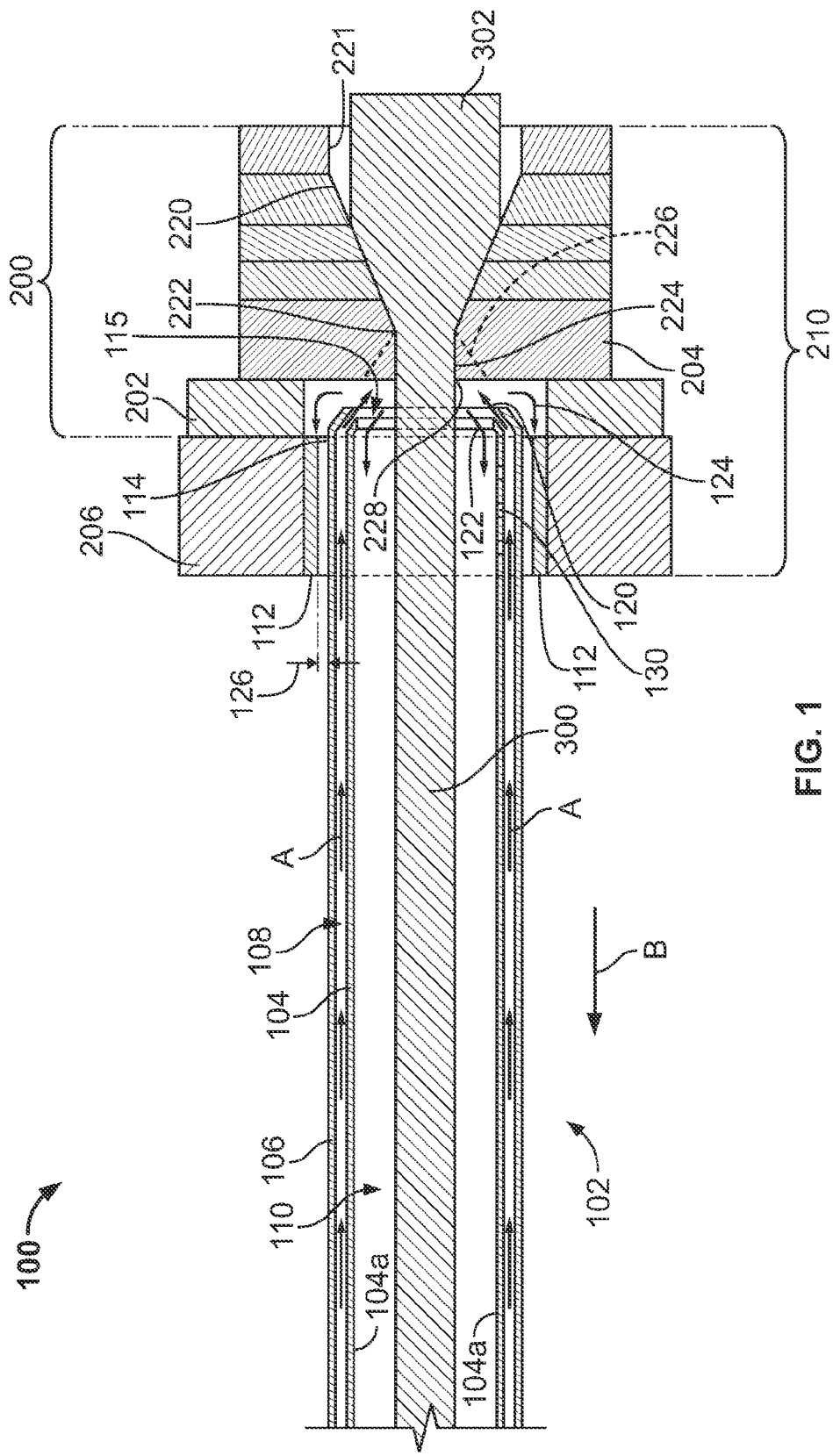
FIG. 1 shows a schematic view of an illustrative quenching system.

FIG. 1 shows a schematic view of a quenching system 100 according to certain embodiments. A quench tube 102 includes an inner wall 104 and an outer wall 106 having a channel 108 therebetween for transporting cooling fluid along the quench tube 102. In certain embodiments, the outer wall 106 may be formed by an outer tube and the inner wall 104 may be formed by an inner tube. As shown in FIG. 1, for example, the cooling fluid travels in the direction of arrow A within the channel 108, which acts as a conduit for delivering the cooling fluid to an extruded material such as the extruded material 300. Any suitable cooling fluid may be used for quenching the extruded material 300, including water, various mineral oils, brines, synthetic oils, any other suitable cooling fluid, including gaseous fluids, or any combination thereof. The inner wall 104 and the outer wall 106 are generally concentric and may have any suitable thickness, including different respective thicknesses between the two walls 104, 106. In certain embodiments, while generally concentric, one of the walls 104, 106 may be elliptical while the other is circular. The quench tube 102 further includes a passage 110 within an inner surface 104a of the inner wall 104 that receives the extruded material 300 and through which the extruded material 300 travels in the direction of arrow B along the quench tube 102.

Figure 2:
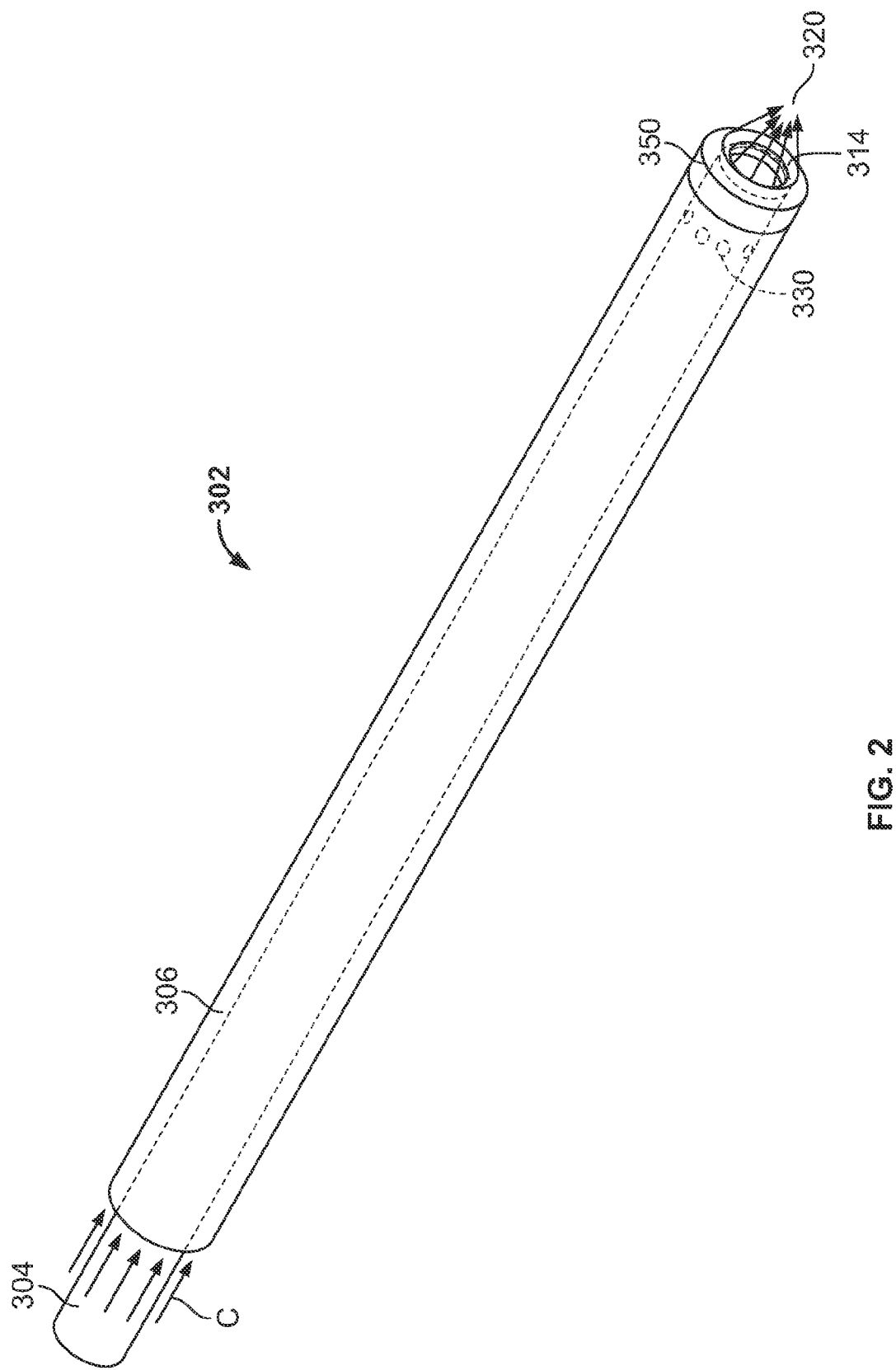
FIG. 2 shows a perspective view of an illustrative quench tube and end cap.
Figure 3:
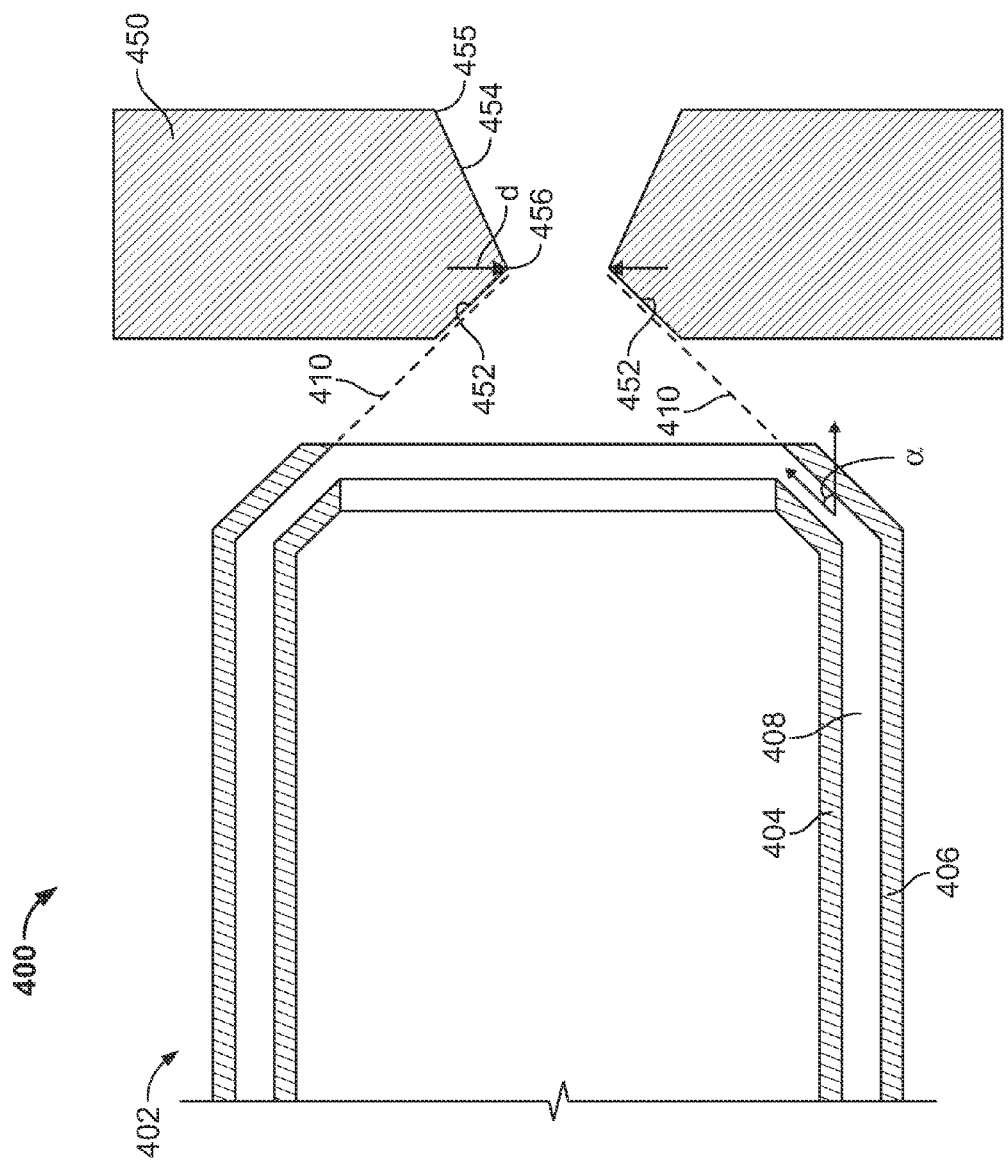
FIG. 3 shows a schematic view of an illustrative quench tube and extrusion die.

The cooling fluid of the quench tube 102 flows along the direction of arrow A to a nozzle 114 formed at an end of the quench tube 102. The nozzle 114 delivers the cooling fluid to the extruded material 300, and the nozzle 114 provides the opening 115 in the quench tube 102 through which the extruded material 300 passes to enter the passage 110. In certain embodiments, the channel 108 is angled at the nozzle 114 to deliver the cooling fluid, along fluid stream 120, at an angle with respect to the quench tube. For example, as shown in FIG. 3, the angle that is formed at the nozzle between the channel and the quench tube is designated by angle α. The nozzle 114 delivers the cooling fluid as a convergent fluid stream 120, where the fluid stream 120 narrows from a first diameter to a second diameter in the direction of flow (along arrow A) and the second diameter is smaller than the first diameter. In certain embodiments, the channel 108 between the inner wall 104 and the outer wall 106 may not be angled, and the angled delivery of cooling fluid at the nozzle may be effected by an end cap, such as the end cap 350 of FIG. 2, having an angled interior surface therein. For example, the inner wall 104 and the outer wall 106 may be formed by respective inner and outer tubes that are generally straight along the length of the quench tube 102, and an end cap may provide for the angled delivery of the cooling fluid. Even in embodiments where the channel 108 is angled at the nozzle 114, it will be understood that the quench tube 102 may incorporate an end cap such as the end cap 350 of FIG. 2.

The quench tube 102 is configured to extend, at least in part, within an extrusion die such as extrusion die 200. The extrusion die 200 includes a base plate 202 and, in certain embodiments, one or more die plates 204, which together are shown as being coupled to a die-backer plate 206. In certain embodiments, the extrusion die 200 and the die-backer plate 206 form a die assembly 210 that rotates, although it will be understood that the quench tube 102 may be used in extrusion systems that do not utilize a rotating extrusion die 200. Furthermore, the quench tube 102 of the present disclosure does not rotate, although it will be appreciated that in certain embodiments the quench tube 102 may be configured to rotate. Rotating extrusion die assemblies are discussed in detail in U.S. patent application Ser. No. 13/650,981, filed concurrently herewith, and entitled "EXTRUSION PRESS DIE ASSEMBLY," the disclosure of which is hereby incorporated by reference herein in its entirety.

The extrusion die 200 generally includes a profile 220 formed in the one or more die plates 204 and having an entry diameter 221 that decreases to a point where the profile 220 sets the outer diameter of the extruded material 300. At that point, shown by label 222, the material (e.g., the billet 302) has been substantially fully deformed by the extrusion press die 200 and proceeds to exit the die 200 along the remaining portion, if any, of the die plate profile 220. For example, in certain embodiments the extruded material may pass through a portion 224 of the profile 220, beyond point 222, before exiting the extrusion die 200 at exit region 228. In certain embodiments, however, there may be a cutout or recess 226 formed in the extrusion die 200 beyond the point 222 at which the outer diameter of the extruded material is set. The entry diameter 221 is preferably slightly larger than the original diameter of the billet 302 that is pressed into the extrusion die 200 to prevent obstructing or otherwise restricting the billet 302 from entering the die 200. The billet 302 may be formed from any suitable material for use in extrusion press systems including, but not limited to, various metals including copper and copper alloys, or any other suitable non-ferrous metals such as aluminum, nickel, titanium, and alloys thereof, ferrous metals including steel and other iron alloys, polymers such as plastics, or any other suitable material or combinations thereof.

The cooling fluid is delivered to the extruded material 300 using the nozzle 114 formed at an end of the quench tube 102. As discussed above, the cooling fluid is delivered at an angle along a fluid stream 120 with respect to the quench tube 102 (and the extruded material 300 itself) and thus quenches the extruded material 300 as it exits the extrusion die 200. During the spray-quenching process, excess cooling fluid generally flows back into the passage 110 with the extruded material 300, shown by arrow 122, or flows around the nozzle 114 and between the quench tube 102 and die assembly 210, shown by arrow 124. For excess cooling fluid that flows along the direction of arrow 122, this cooling fluid exits at an opposite end of the quench tube 102 with the extruded material 300. For excess cooling fluid that flows along the direction of arrow 124, the cooling fluid passes through an engineered clearance 126 between the quench tube 102 and a support bushing 112 located between the quench tube 102 and the die-backer plate 206/base plate 202. The engineered clearance 126 between and along these components (via the support bushing 112) is provided for relief or drainage of the excess cooling fluid. The dimensions of the engineered clearance 126 can be adjusted to change the fluid flow properties of the cooling fluid. Providing an engineered clearance 126 between the quench tube 102 and the die-backer plate 206/base plate 202 by way of the support bushing 112 improves the heat exchange process because increasing the engineered clearance 126 allows, for example, an increase in flow for the excess cooling fluid.

With respect to the relief or drainage of excess cooling fluid, in certain embodiments a plurality of holes 130 may be provided in the inner wall 104 along at least a portion of the quench tube 102. In some embodiments, the plurality of holes 130 may be equidistant from one another, although they may be provided in any suitable spatial arrangement with respect to one another. Any number of holes 130 may be provided, including, for example, 30 or more holes along a length and/or diameter or circumference of the inner wall 104. For example, holes 130 are shown along a length of the inner wall 104 and holes 330 of FIG. 2 are shown along a diameter or circumference of the inner wall 304. Furthermore, the holes 130 may have any size diameter, including diameters of approximately $\frac{1}{16}$ of an inch, or any other suitable diameter. In certain embodiments, at least some of the holes 130 may have different respective diameters from others. The holes 130 may create a Venturi effect for the excess cooling fluid and, with the engineered clearance 126 described above, may increase the relief of excess cooling fluid during operation of the quench tube 102. The Venturi effect may result when the cooling fluid flowing through holes 130, oriented less than 90-degrees in the extrusion direction (arrow B), produces a partial vacuum using the kinetic energy of the fluid stream 120.

As discussed above, in certain embodiments, an end cap may be provided at the nozzle 114 end of the quench tube 102. For example, FIG. 2 shows a perspective view of a quench tube 302 having an end cap 350. The end cap 350 is positioned at the nozzle 314 such that the angled channel of the nozzle 314 (or in some embodiments a non-angled channel of the nozzle 314) is positioned within the end cap 350. The end cap 350 is structured to fit within a portion of an extrusion die, and may be structured to withstand the heat generated as a result of the extrusion. FIG. 2 also shows the inner wall 304 and the outer wall 306 of the quench tube 302, along with arrow C indicating the direction of flow of the cooling fluid in the channel between the inner 304 and outer walls 306. The cooling fluid flows between the inner and outer walls 304, 306 along the direction of arrow C and exits the end cap 350 as a fluid stream 320. The nozzle 314 and end cap 350 deliver the cooling fluid as a convergent fluid stream 320, where the fluid stream 320 narrows from a first diameter to a second diameter in the direction of flow (along arrow C) and the second diameter is smaller than the first diameter. In certain embodiments, the shape of the fluid stream 320 may be configured to substantially conform to or complement the shape of a cutout or recess in an extrusion die (e.g., cutout or recess 226 in the extrusion die 200 of FIG. 1). Various cutouts or recesses formed in an extrusion die are further discussed below with reference to FIG. 3.

FIG. 3 shows a schematic view of a quench tube nozzle 400 and extrusion die 450 according to certain embodiments, where the extrusion die 450 includes cutouts or recesses 452 formed therein. The extrusion die 450 has a profile 454 along which a billet is extruded to form an extruded material. The profile 454 has an entry diameter 455 that decreases to a point at which the profile 454 sets the outer diameter of the extruded material. At that point, shown by label 456, the material has been substantially fully deformed by the extrusion process, the outer diameter, d, of the extruded material has been set, and the material is extruded from the die 450. In certain embodiments, a cutout or recess 452 may be formed in the extrusion die 450 to allow access for the delivery of cooling fluid from the nozzle 400 of the quench tube 402. The quench tube 402 includes in inner wall 404, outer wall 406, and channel 408 therebetween, which channel 408 delivers the cooling fluid via the nozzle 400 along the directions shown by fluid flow lines 410. The cooling fluid is delivered at an angle, $\alpha$, that aligns with the cutout or recess 452 formed at an angle into the extrusion die 450. The nozzle 400 delivers the cooling fluid as a convergent fluid stream that narrows from a first diameter, at the outlet of the nozzle, to a second diameter proximate to the exit region 456, in the direction of flow, where the second diameter is smaller than the first diameter. The convergent fluid stream is shaped, therefore, to substantially conform to the shape of the cutout or recess 452 in the extrusion die 450. The cutouts or recesses 452 in the extrusion die 450 may be formed as any suitable shape. It will be understood that the angle at which the cooling fluid is delivered from the nozzle 400 of the quench tube 402 may be adjusted or otherwise modified to any desired application angle, $\alpha$, to conform to the cutouts or recesses 452 of the extrusion die 450.

The quench tube 102 of the present disclosure allows for improved spray-quenching of an extruded material with respect to the point at which the extruded material exits an extrusion die. As discussed above, the quench tube (e.g., quench tube 102, 302, 402) is configured to extend, at least in part, within an extrusion die (e.g., extrusion die 200, 450). In certain embodiments, the quench tube is positioned approximately $\frac{15}{16}$ of an inch beyond the die-backer plate 206 and within the extrusion die 200, although any position within the extrusion die 200 may be used. This position, along with the angled fluid flow of the cooling fluid relative to the quench tube (and surface of the extrusion), has been calculated to impinge the extrusion in a counter current flow pattern 410 that flows over the extruded material to the exit point of the extruded material from the rotating die (e.g., exit region 228 of FIG. 1 and exit region 456 of FIG. 3). In certain embodiments, the cooling fluid may contact the extruded material at any desired distance from the extrusion die, including, for example, within approximately ⅛ of an inch, or closer, to the point of exit from the extrusion die.

The quench tubes of the disclosure (e.g., quench tube 102 of FIG. 1) may be formed of any suitable durable and substantially rigid material, including, but not limited to, various polymers such as polyethylene (including high density polyethylene, low density polyethylene, and polyethylene terephthalate), polypropylene, polyvinyl chloride, polystyrene, post-consumer resins, or any other suitable moldable polymers including biodegradable polymers such as polylactide; various metals including steel, tin, aluminum, copper, or any other suitable metals or alloys; any other suitable material; or combinations thereof.

The end caps of the disclosure (e.g., end cap 350 of FIG. 2) may be formed of any suitable material that is preferably heat resistant, including, but not limited to, various polymers, metals including steel, tin, aluminum, copper, or any other suitable metals or alloys, any other suitable material, or combinations thereof.

Although each of the above described and illustrated embodiments of a quench tube system show the quench tube having substantially round cross-sections, it will be understood that any of a wide variety of shapes may be utilized to form the quench tube and the first and second walls of the quench tube. For example, the quench tube may have cross-sectional areas that are circular, elliptical, rectangular, triangular, hexagonal, or any other desired shape or combinations thereof.

The foregoing is merely illustrative of the principles of the disclosure, and the systems, devices, and methods can be practiced by other than the described embodiments, which are presented for purposes of illustration and not of limitation. It is to be understood that the systems, devices, and methods disclosed herein, while shown for use in extrusion press systems, may be applied to systems, devices, and methods to be used in other manufacturing procedures including, but not limited to, cast-and-roll, up-casting, other extrusion, and other manufacturing procedures.

Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

What is claimed is:

1. A quench tube comprising:
   an inner wall and an outer wall having a channel therebetween for transporting cooling fluid along the quench tube;
   a passage within an inner surface of the inner wall that receives an extruded material; and
   a nozzle formed at an end of the quench tube that delivers the cooling fluid to the extruded material, the nozzle defining an entrance to the passage, wherein the channel is angled at the nozzle to deliver the cooling fluid at an angle with respect to the quench tube, and wherein the nozzle is shaped to deliver the cooling fluid at an angle having a direction that is opposite a direction in which the extruded material is extruded;
   wherein the quench tube is configured to deliver the cooling fluid such that the cooling fluid contacts the extruded material upon the extruded material exiting an extrusion die plate used for deforming the extruded material.

2. The quench tube of claim 1, further comprising a plurality of holes in the inner wall along at least a portion of the quench tube.

3. The quench tube of claim 2, wherein the plurality of holes are equidistant from one another.

4. The quench tube of claim 1, further comprising an end cap positioned at the nozzle, wherein the angled channel is positioned within the end cap.

5. The quench tube of claim 4, wherein the end cap is structured to fit within a portion of an extrusion die.

6. The quench tube of claim 5, wherein the cooling fluid is delivered through the end cap.

7. The quench tube of claim 1, wherein the nozzle is configured to deliver the cooling fluid at an angle that substantially aligns with a recess formed in an exit side of an extrusion die.

8. The quench tube of claim 1, wherein the nozzle is configured to deliver the cooling fluid as a convergent fluid stream, wherein the fluid stream narrows from a first diameter to a second diameter in the direction of flow, and wherein the second diameter is smaller than the first diameter.

9. The quench tube of claim 8, wherein the convergent fluid stream is shaped to substantially conform to the shape of a conical recess formed in an exit side of an extrusion die.

10. The quench tube of claim 1, wherein the quench tube is configured to extend at least in part within a rotating extrusion die.

11. The quench tube of claim 1, wherein the inner wall and the outer wall are concentric.

12. The quench tube of claim 1, wherein the inner wall comprises an inner tube and the outer wall comprises an outer tube.

13. The quench tube of claim 1, wherein the quench tube is configured to deliver the cooling fluid such that the cooling fluid contacts the extruded material within approximately 1/16 of an inch to 1 inch of the extruded material exiting an extrusion die.

14. The quench tube of claim 13, wherein the quench tube is configured to deliver the cooling fluid such that the cooling fluid contacts the extruded material within approximately ⅛ Of an inch to ½ of an inch of the extruded material exiting an extrusion die.

15. The quench tube of claim 1, wherein the cooling fluid is water.

16. The quench tube of claim 1, wherein the channel for transporting cooling fluid along the quench tube terminates at an extremity of the quench tube.

17. The quench tube of claim 1, further comprising a support bushing positioned around a portion of the outer wall of the quench tube, wherein the support bushing defines a clearance space between the quench tube and a rotating plate.

18. A quench tube comprising:
   an inner wall and an outer wall having a channel therebetween for transporting cooling fluid along the quench tube;
   a passage within an inner surface of the inner wall that receives an extruded material; and
   a nozzle formed at an end of the quench tube that delivers the cooling fluid to the extruded material, the nozzle defining an entrance to the passage, wherein the nozzle is shaped to deliver the cooling fluid at an angle having a direction that is opposite a direction in which the extruded material is extruded;

wherein the quench tube is configured to deliver the cooling fluid such that the cooling fluid contacts the extruded material upon the extruded material exiting an extrusion die plate used for deforming the extruded material.

19. The quench tube of claim 18, wherein the quench tube is configured to extend at least in part within a rotating extrusion die.

20. A quench tube comprising:
    an inner wall and an outer wall having a channel therebetween for transporting cooling fluid along the quench tube;
    a passage within an inner surface of the inner wall configured to receive an extruded material; and
    a nozzle formed at an end of the quench tube for delivering the cooling fluid, the nozzle defining an entrance to the passage, wherein the nozzle is shaped to deliver the cooling fluid at an angle having a direction that is opposite a direction in which extrusion occurs.

21. The quench tube of claim 20, further comprising a support bushing positioned around a portion of the outer wall of the quench tube, wherein the support bushing defines a clearance space between the quench tube and a rotating plate.

* * * * *